July 24, 1928.　　　　　　　　　　　　　　　　1,678,422
J. DUGDILL
MOVABLE SUPPORT FOR ELECTRIC LIGHT, GAS, AND OTHER PURPOSES
Filed Feb. 21, 1923　　　2 Sheets-Sheet 1
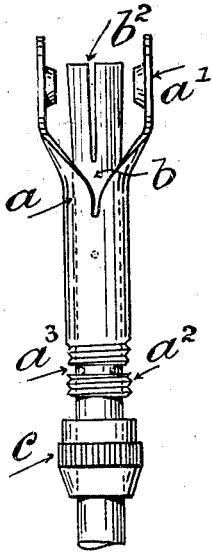
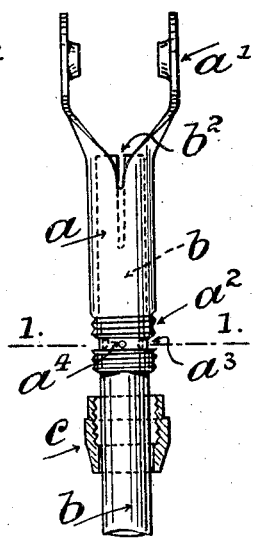
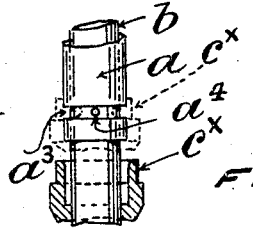
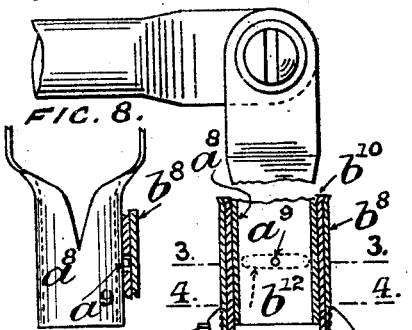
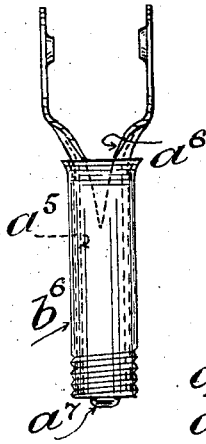
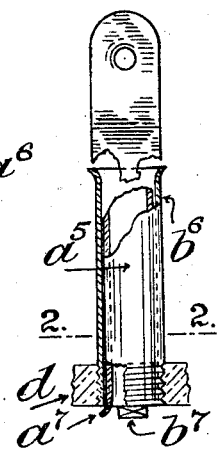
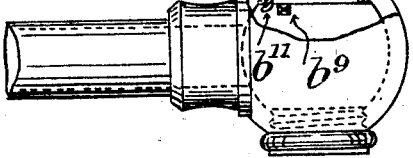
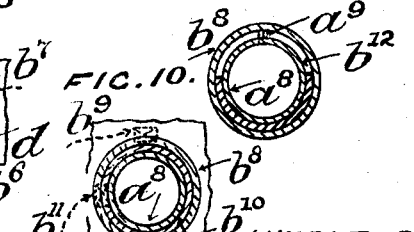
INVENTOR:
John Dugdill
BY Wm Wallace White
ATTY.

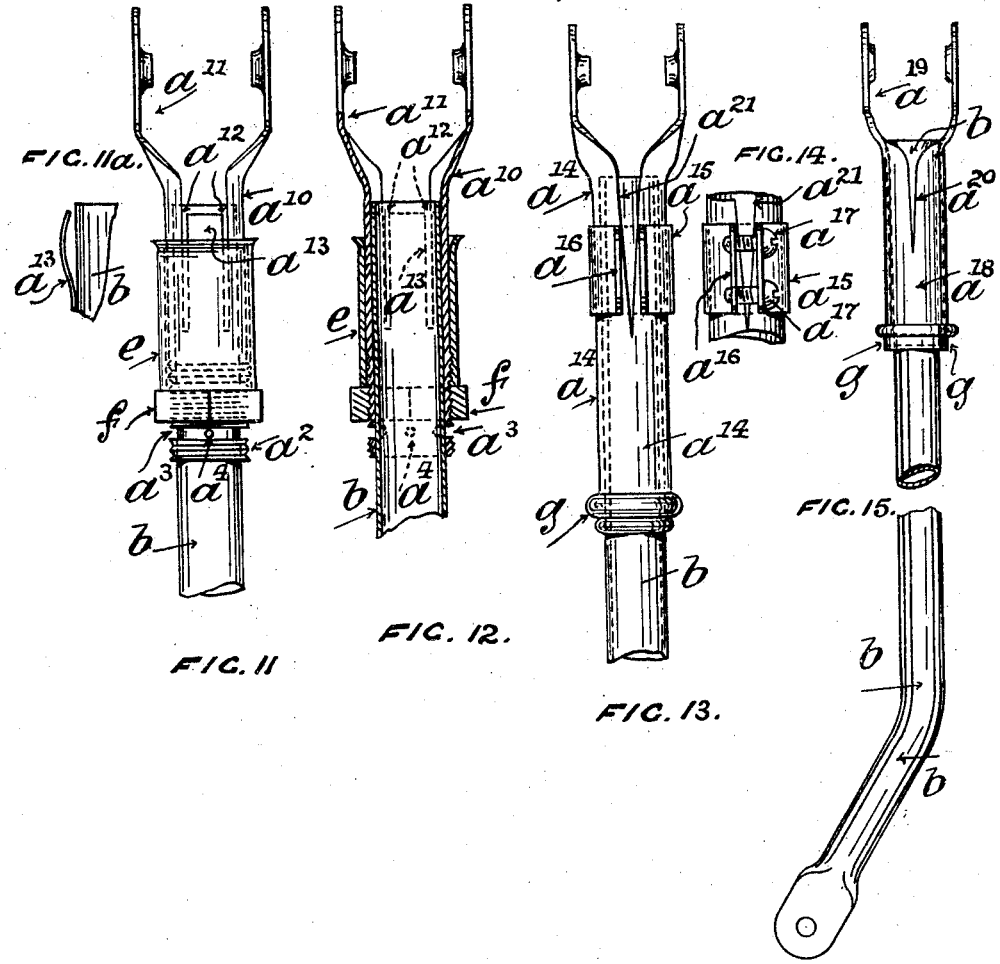

Patented July 24, 1928.

1,678,422

UNITED STATES PATENT OFFICE.

JOHN DUGDILL, OF HAZEL GROVE, NEAR STOCKPORT, ENGLAND.

MOVABLE SUPPORT FOR ELECTRIC LIGHT, GAS, AND OTHER PURPOSES

Application filed February 21, 1923, Serial No. 620,550, and in Great Britain May 13, 1922.

My improvements relate to knuckle or fork jointed fittings for supporting or carrying electric lights or for other purposes where a movable or articulated self-sustaining support is required, and the object is to simplify and improve the efficiency of such fork jointed fittings.

I use metal tubes in the production of the improved fittings and according to my invention I split or slit the tubes or certain of them, in order to obtain an improved frictional effect between combining tubes resulting in greater frictional efficiency and ensuring lasting qualities. Further, I along therewith, provide for rotary movement or partial rotary movement in an extremely simple manner such means permitting of easy rotation of one or more elements in the combination. Also, means may be provided which permit of adjustment of the socketing elements or allow of wear being taken up.

The attached drawings illustrate examples of means which may be employed by me in the carrying out of my invention whereby improved sleeve like joints are obtained for fork jointed fittings for electric lighting and other work.

In the said drawings:

Fig. 1 shows an elevation of a tubular arm structure, with knuckle joint provision at each end, with the main tubular element socketed in a tubular fork and provision made for rotation of such tubular fork to the extent of about ⅔rds of a revolution. The elements are not in finished assembly for the sake of clearness.

Fig. 2 is a view of the upper part of Fig. 1 with the elements assembled.

Fig. 2ª is a detail view of a plain masking thimble.

Fig. 3 shows a section on the line 1—1, Fig. 2.

Fig. 4 is an elevation of another form of fitting consisting of combined sleeved elements with means for permitting limited rotation of one element.

Fig. 5 is a side elevation, partly in section, of Fig. 4.

Fig. 6 is a section on the line 2—2, Fig. 5.

Fig. 7 illustrates another form of knuckle joint fitting wherein provision is made for rotation of the jointed arm through more than 250°.

Fig. 8 is a detail view of part of Fig. 7.

Fig. 9 shows a section on the line 3—3, Fig. 7.

Fig. 10 is a section on the line 4—4, Fig. 7.

Fig. 11 illustrates another modification.

Fig. 11ª is a separate detail view to be examined with Fig. 11.

Fig. 12 shows a section of Fig. 11.

Fig. 13 illustrates another modification.

Fig. 14 is a detail view of Fig. 13.

Fig. 15 shows another modified construction.

Referring to the construction Figs. 1, 2 and 3, I there illustrate knuckle joint tubular fittings, the combined tubes of which are sleeved or telescoped together. The main tube element $b$ has a forked extremity $b'$ and the upper end of the tube is slit at $b^2$ and slightly expanded. On this tube element $b$ I sleeve or socket the tube $a$ which has a forked extremity $a'$ and a screw-thread $a^2$ cut on the exterior of the tube $a$. In this tube $a$ I cut a partly circumferential slot $a^3$ and a pin $a^4$ is fitted into a hole in the wall of the other tube $b$ and projects into the slot $a^3$. The position of the slot and pin may be reversed in the tubes. With the construction shown, in Figs. 1 to 3, the one tube may rotate upon the other to an extent governed by the length of the slot. A screwed thimble or cap $c$ may be employed to mask the slot and pin as Figs. 1 and 2 indicate. Instead of a screwed thimble $c$ I may leave the end of the tube $a$ plain and force a plain thimble $c^x$ onto the tube $a$ to mask the slot and pin, as is indicated in Fig. 2ª. It is to be particularly noted that the reinforcing ferrule in its threaded form engages the threaded portions on the respective sides of the slot in the outer tube, and by this engagement so unites the portions of the tube on opposite sides of the slot as to materially reinforce the tube at this point against breakage on unusual strain on the parts.

When not convenient to employ the slot and pin construction I sleeve or socket the tube $a^5$ (which is split at $a^6$ and slightly expanded) within the outer support tube $b^6$ which is screwed into any base or support such as $d$ and has a small projection or stop $b^7$. The lower end of the tube $a^5$ has a projecting extension $a^7$ which is bent over slightly, thus forming an abutment piece which will ultimately encounter the stop $b^7$ if a full turning movement is made. The fitting can be made complete and simply screwed into place in the base or support. Under such an arrangement a turning movement of over 250° can be made.

In case movement exceeding 250° is desired, I may, as shown by Figs. 7, 8, 9 and 10, form the outer sleeve $b^8$ with a stop piece $b^9$ and use an intermediate sleeve $b^{10}$ with a bent over abutment piece $b^{11}$. In this same sleeve $b^{10}$ I cut a slot $b^{12}$ and in the third tubular element $a^8$ I apply a pin $a^9$ which plays in the slot $b^{12}$. It will be obvious that this construction allows of a rotary movement of the third tubular element $a^8$ and any tubular or other fitting supported thereby through more than 360°. In this example, one of the tubular or sleeved elements is preferably split or expanded, as for example the third tubular element $a^8$.

When controllable rotational friction between two sleeved or telescoped tubular members is desired I may use the arrangement illustrated by Figs. 11 and 12 where a main tube $b$ is shown upon which is fitted an upper tube element $a^{10}$. This tube element has a fork $a^{11}$ and is slit in two places $a^{12}$, $a^{12}$ diametrically opposite, to produce tongues $a^{13}$ which tongues are or may be slightly expanded or bent out (see Fig. 11$^a$) thus producing resilient tongues as it were. The tube element $a^{10}$ has a slot $a^3$ cut therein and a pin $a^4$ projects into the slot from the inner tube $b$ the lower end of the tube element $a^{10}$ being formed with a screw thread $a^2$. A sleeve $e$ slightly flared at the top fits over the tube element $a^{10}$ and this is pressed upwards by a nut $f$ which can be adjusted to cause the sleeve $e$ to press inwards the tongues $a^{13}$ and so to compress same into closer binding contact with the inner tube $b$. Thus, as the nut $f$ is advanced, the slit outer tube $a^{10}$ is gradually closed on the inner tube $b$ and power of adjustment to compensate for any wear or frictional adjustment is obtained. As a modification, the screw thread $a^2$ might be omitted and a masking device forced on to shroud the slot and pin and to jamb the sleeve $e$.

In the example illustrated by Figs. 13 and 14, I use an inner tube $b$ upon which an outer tube $a^{14}$ is shown sleeved, this outer tube having a forked extremity and being split at $a^{21}$, the top of the inner tube being preferably slightly expanded or even split so that the two tubes sleeve well together. A stopper fitting $g$ is secured to the tube $b$ to abut at the end of or against the outer tube $a^{14}$. Around the outer tube $a^{14}$ is fitted a split clip $a^{15}$ with angle flanges $a^{16}$, which are tapped, and screws $a^{17}$ are applied, by acting on which the split clip can be caused to bind the outer tube $a^{14}$ upon the inner tube $b$ and adjustments for wear made.

The arrangement shown in Fig. 15 represents a fork ended fitting such as may be used when hinged tubular structures are required to fold-up parallel provision being made by cranking one end of the main tube $b$. In this showing, the main tube $b$ is fitted with a tube $a^{18}$ sleeved over the former, and formed with a fork $a^{19}$ and split at $a^{20}$. When the elements are sleeved, the upper end of the tube $b$ is slightly flared or expanded, as the drawing shows, thus making secure one end of the outer sleeved element $a$. On the inner or main tube $b$ I fix a stopper piece $g$ against which the lower end of the outer sleeved element $a^{18}$ bears.

In all the examples given, will be found the features of expansible or accommodating tube elements sleeve socketed with proper provision made to permit of rotary movement of one or more of the combining tubular elements. Thus, under my invention, I produce efficient expansibly socketed or sleeved elements and in which provision exists for rotary movement axially as respects the several tubular elements used in combination.

I declare that what I claim is:

A slight fixture support comprising an outer tube having a forked extremity at one end and threaded at the opposite end, an inner tube frictionally fitting within the outer tube to permit resisted relative rotation of the tubes, the inner tube extending beyond the threaded end of the outer tube, a pin projecting from the inner tube and seating in a circumferentially disposed slot formed in the threaded portion of the outer tube, the length of the slot being less than the circumferential length of the threaded portion to thereby limit the relative rotative movements of the tubes, and a ferrule having a sliding fit on the inner tube and interiorly threaded to cooperate with the threaded portion of the outer tube in both directions beyond the slot therein, whereby the slot and pin connection of the tubes is completely covered by the ferrule and the latter acts to connect the portions of the outer tube in both directions beyond the slot to thereby reinforce the outer tube in the slotted area.

In testimony whereof I have signed my name to this specification.

JOHN DUGDILL.